(12) United States Patent
Kim

(10) Patent No.: US 11,363,193 B2
(45) Date of Patent: Jun. 14, 2022

(54) ELECTRONIC APPARATUS AND IMAGE CORRECTION METHOD THEREOF

(71) Applicant: SAMSUNG ELECTRONICS CO., LTD., Suwon-si (KR)

(72) Inventor: Soo-Hong Kim, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 244 days.

(21) Appl. No.: 16/754,328

(22) PCT Filed: Oct. 8, 2018

(86) PCT No.: PCT/KR2018/011820
§ 371 (c)(1),
(2) Date: Apr. 7, 2020

(87) PCT Pub. No.: WO2019/088481
PCT Pub. Date: May 9, 2019

(65) Prior Publication Data
US 2020/0336657 A1    Oct. 22, 2020

(30) Foreign Application Priority Data
Nov. 3, 2017  (KR) .......................... 10-2017-0146085

(51) Int. Cl.
*H04N 5/232* (2006.01)
*H04N 9/64* (2006.01)
*G06V 10/50* (2022.01)

(52) U.S. Cl.
CPC ......... *H04N 5/23229* (2013.01); *G06V 10/50* (2022.01); *H04N 9/643* (2013.01)

(58) Field of Classification Search
CPC ................................................. H04N 5/23229
(Continued)

(56) References Cited

U.S. PATENT DOCUMENTS 7,783,126 B2   8/2010   Yamashita et al.
7,945,115 B2   5/2011   Yamashita et al.
(Continued)

FOREIGN PATENT DOCUMENTS

JP    4389671    12/2009
JP    5166860    3/2013
(Continued)

OTHER PUBLICATIONS

International Search Report dated Feb. 1, 2019, in corresponding International Patent Application No. PCT/KR2018/011820.
(Continued)

*Primary Examiner* — Joel W Fosselman
(74) *Attorney, Agent, or Firm* — Staas & Halsey LLP

(57) ABSTRACT

An electronic device is provided. The electronic device includes a camera, a communication interface, and a processor configured to capture an image of a background of a display device through the camera, to divide the captured image into a plurality of blocks, to compare a target gradation value with gradation values of the each of the plurality of blocks, to adjust the gradation values of the each of the plurality of blocks, and to transmit an image of which the gradation values are adjusted, to the display device through the communication interface, wherein the sizes of the plurality of blocks are identified based on a background pattern of the display device.

15 Claims, 10 Drawing Sheets

(58) Field of Classification Search
USPC .................................................... 348/222.1
See application file for complete search history.

(56) References Cited

U.S. PATENT DOCUMENTS

| | | | |
|---|---|---|---|
| 9,542,730 B2 | 1/2017 | Yamada | |
| 10,467,933 B2 | 11/2019 | Hur et al. | |
| 2007/0071318 A1* | 3/2007 | Yamashita | ................ G06T 5/20 382/169 |
| 2013/0089265 A1 | 4/2013 | Yie et al. | |
| 2014/0313117 A1 | 10/2014 | Addy et al. | |

FOREIGN PATENT DOCUMENTS

| | | |
|---|---|---|
| JP | 2017-68513 | 4/2017 |
| KR | 10-2011-0051072 | 5/2011 |
| KR | 10-1089394 | 12/2011 |
| KR | 10-2015-0106775 | 9/2015 |
| KR | 10-1667282 | 10/2016 |
| KR | 10-2017-0050995 | 5/2017 |

OTHER PUBLICATIONS

Written Opinion of the International Searching Authority dated Feb. 1, 2019, in corresponding International patent Application No. PCT/KR2018/011820.

Korean Office Action dated Apr. 25, 2021 from Korean Application No. 10-2017-0146085.

\* cited by examiner (a)                                       (b)

(a)

(b)

(c)

(d)

(a)

(b)

(c)

(a)

(b)

(c)

(a)

(b)

(c)

(d)

ELECTRONIC APPARATUS AND IMAGE CORRECTION METHOD THEREOF

CROSS-REFERENCE TO RELATED APPLICATIONS

This application is a U.S. National Stage Application which claims the benefit under 35 U.S.C. § 371 of International Patent Application No. PCT/KR2018/011820 filed on Oct. 8, 2018, which claims foreign priority benefit under 35 U.S.C. § 119 of Korean Patent Application No. 10-2017-0146085 filed on Nov. 3, 2017 in the Korean Intellectual Property Office, the contents of both of which are incorporated herein by reference.

TECHNICAL FIELD

The disclosure relates to an electronic device and an image correction method thereof, and more particularly, to an electronic device which corrects an image and an image correction method thereof.

BACKGROUND ART

A display device such as a television, or the like is a device for displaying an image. Recently, not only a function for displaying an image, but also a function for providing a variety of experiences to a user has been added.

However, when the display device displays an image, when light is emitted by an ambient light source, the area where the light is illuminated gets brighter than other areas, so that the corresponding part is recognized as a different color to the user.

DETAILED DESCRIPTION OF THE INVENTION

Technical Problem

Accordingly, an object of the disclosure is to provide an electronic device capable of correcting a gradation value, for each block, of a background image displayed on a display device using the electronic device, and an image correction method thereof.

Technical Solution

An aspect of the embodiments relates to an electronic device including a camera, a communication interface, and a processor configured to capture a background of a display device through the camera, to divide the captured image into a plurality of blocks, to compare a target gradation value with gradation values of the each of the plurality of blocks, to adjust the gradation values of the each of the plurality of blocks, and to transmit an image of which the gradation values are adjusted, to the display device through the communication interface, wherein the sizes of the plurality of blocks are identified based on a background pattern of the display device.

The processor may be configured to identify the sizes of the blocks on the basis of at least one of a size, complexity, and a type of the background pattern and to divide the captured image into the plurality of blocks on the basis of the identified size.

The processor may be configured to divide the captured image into the plurality of blocks such that each block has a size corresponding to the background pattern, and the larger the size of the background pattern is, the relatively larger the size of the block may become, and the smaller the size of the background pattern is, the relatively smaller the size of the block may become.

The processor may be configured, on the basis of frequency components of the captured image, to identify that the background pattern has a first size, based on high-frequency components being relatively more than low-frequency components in the captured image, and to identify that the background pattern has a second size, based on low-frequency components being relatively more than high-frequency components in the capture image, wherein the second size is larger than the first size.

The processor may be configured to divide the captured image into the plurality of blocks such that each block has a size corresponding to complexity of the background, and the higher the complexity of the background is, the relatively larger the size of the block may become, and the lower the complexity of the background is, the relatively smaller the size of the block may become.

The processor may be configured to calculate a variance of the captured image and divide the capture image into the plurality of blocks on the basis of complexity corresponding to the variance among a plurality of complexity.

The processor may be configured to divide the captured image into the plurality of blocks such that each block has a size corresponding to the background pattern.

The processor may be configured to identify a type of the background pattern by performing image search for the captured image through a web server.

The processor may be configured to normalize the gradation values of the each of the plurality of blocks, compare the normalized respective gradation values and average values of the normalized gradation values to calculate adjustment values of the each of the plurality of blocks, and adjust the gradation values of the each of the plurality of blocks on the basis of the calculated adjustment values.

An aspect of embodiments relates to an image correction method of an electronic device includes capturing a background of a display device, dividing the captured image into a plurality of blocks, comparing a target gradation value with gradation values of the each of the plurality of blocks and adjusting the gradation values of the each of the plurality of blocks, and transmitting an image of which the gradation values are adjusted, to the display device, wherein the sizes of the plurality of blocks are identified based on a background pattern of the display device.

The dividing may include identifying the sizes of the blocks on the basis of at least one of a size, complexity, and a type of the background pattern and dividing the captured image into the a plurality of blocks on the basis of the identified size.

The dividing may include dividing the captured image into the plurality of blocks such that each block has a size corresponding to the background pattern, and the larger the size of the background pattern is, the relatively larger the size of the block may become, and the smaller the size of the background pattern is, the relatively smaller the size of the block may become.

The dividing may include, on the basis of frequency components of the captured image, identifying that the background pattern has a first size, based on high-frequency components being relatively more than low-frequency components in the captured image, and identifying that the background pattern has a second size, based on low-frequency components being relatively more than high-frequency components in the captured image, wherein the second size is larger than the first size.

The dividing may include dividing the captured image into the plurality of blocks such that each block has a size corresponding to complexity of the background, and the higher the complexity of the background is, the relatively larger the size of the block may become, and the lower the complexity of the background is, the relatively smaller the size of the block may become.

The dividing may include calculating a variance of the captured image and dividing the captured image into the plurality of blocks on the basis of complexity corresponding to the variance among a plurality of complexity.

Effect of the Invention

According to the various embodiments of the disclosure, a gradation value of an image can be corrected by each block having a size identified based on a background pattern, so that a white balance of a captured image can be finely corrected even in illumination environment in which a plurality of light sources exist, and an influence of the pattern can be minimized when light shines on.

BEST MODE FOR IMPLEMENTING THE DISCLOSURE

Mode for Implementing the Disclosure

The present disclosure may have several embodiments, and the embodiments may be modified variously. In the following description, specific embodiments are provided with accompanying drawings and detailed descriptions thereof. However, this does not necessarily limit the scope of the exemplary embodiments to a specific embodiment form. Instead, modifications, equivalents and replacements included in the disclosed concept and technical scope of this specification may be employed. While describing exemplary embodiments, if it is determined that the specific description regarding a known technology obscures the gist of the disclosure, the specific description is omitted.

The terms such as "first," "second," and so on may be used to describe a variety of elements, but the elements should not be limited by these terms. The terms used herein are solely intended to explain specific example embodiments, and not to limit the scope of the present disclosure.

The terms used herein are solely intended to explain a specific exemplary embodiment, and not to limit the scope of the present disclosure. Singular forms are intended to include plural forms unless the context clearly indicates otherwise. The terms "include", "comprise", "is configured to," etc., of the description are used to indicate that there are features, numbers, steps, operations, elements, parts or combination thereof, and they should not exclude the possibilities of combination or addition of one or more features, numbers, steps, operations, elements, parts or a combination thereof.

In the embodiments disclosed herein, a term 'module' or 'unit' refers to an element that performs at least one function or operation. The 'module' or 'unit' may be realized as hardware, software, or combinations thereof. In addition, a plurality of 'modules' or a plurality of 'units' may be integrated into at least one module and may be at least one processor except for 'modules' or 'units' that should be realized in a specific hardware.

Below, example embodiments will be described in detail with reference to the attached drawings.

Figure 1:
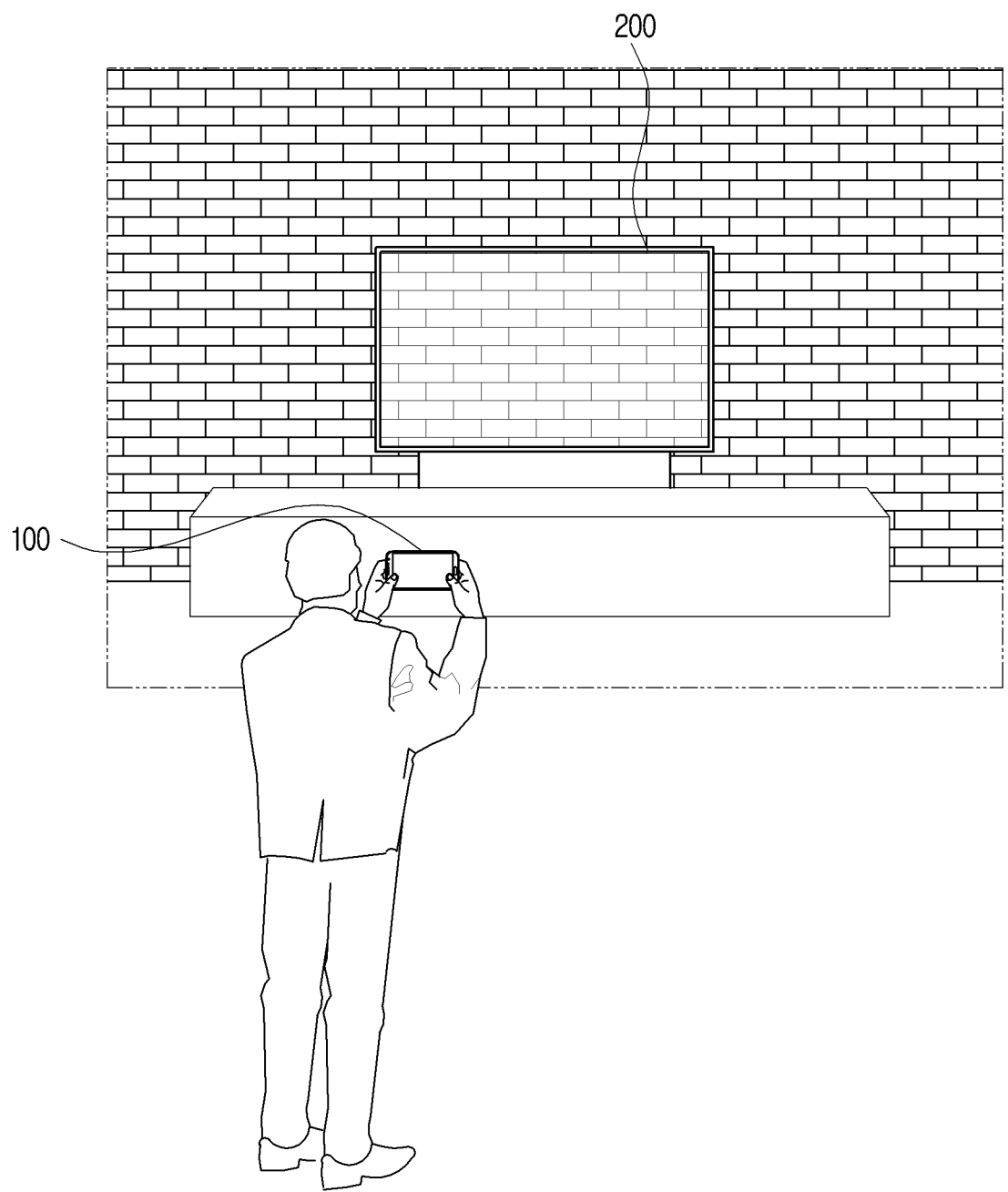
FIG. 1 is a diagram illustrating an operation of a display device according to an embodiment.

FIG. 1 is a diagram illustrating an operation of a display device according to an embodiment.

The display device 200 according to an embodiment of the disclosure provides two operation modes.

Here, the display device 200 may be implemented as a television.

Firstly, a first operation mode, for example, is a mode for displaying a normal image. Specifically, the first operation mode is a mode for displaying a pre-stored content or broadcast received from an external source by using an entire screen of the display device.

In addition, a second operation mode is a mode in which the display device 200 displays a background screen so that the user may not easily recognize the display device. The background screen is a screen in which the user captured a background where the display device 200 is located or surroundings thereof in advance. In other words, the user may capture a background of a location where the display device 200 will be located before the display device 200 is located or a surrounding background of the display device 200 after the display device 200 is located through the electronic device 100. In addition, the electronic device 100 may transmit the captured background image, and the display device 200 may display the background image received from the electronic device 100.

When the display device is displayed in the second operation mode as described above, the display device 200 may display a background area behind the display device as a background image, and thereby the user may feel that the display device has become a transparent glass window.

Meanwhile, in the second operation mode, the display device may display a specific graphic object as well as the background screen. In this regard, the specific object may be a clock object, but various objects (e.g., pictures, photos, fish tanks, etc.) that may be attached to a normal wall, may be displayed as well.

The electronic device 100 may capture a background of the display device 200 and transmit the captured image to the display device 200.

In this regard, the electronic device 100 may be implemented as a smartphone. However, it is only an embodiment, and a terminal device 100 may be implemented as various types of electronic devices, which are portable devices, such as a tablet personal computer (PC), a mobile phone, a personal digital assistant (PDA), a portable multimedia player (PMP), a wearable device, and the like.

In this regard, the electronic device 100 may correct a white balance of the captured image and transmit the corrected image to the display device 200.

For example, when natural light such as the sun or room light shines on the display device 200, a part of the image displayed by the display device 200 may be bright, and other parts may be darkened according to a location of the screen of the display device 200 where the light shines, and thus a color of the image may be seen different to the user.

Specifically, when the display device 200 displays the background screen to give a transparent effect to the user, if an image displayed by the display device 200 is shown in different colors to the user according to light, the user may feel may feel difference between the image displayed on the display device 200 and the background, thereby reducing a transparent effect.

Accordingly, according to an embodiment of the disclosure, the electronic device 100 may adjust gradation values of the captured image to correct white balance of the image, and transmit the corrected image to the display device 200. In this case, the electronic device 100 may divide the captured image into a plurality of blocks, and correct the white balance of the captured image by adjusting the gradation values of the each of the plurality of blocks.

As described above, since the electronic device 100 corrects the white balance of the captured image by block, the electronic device 100 may finely correct the white balance of the captured image, even in the illumination environment in which light from a plurality of light sources, such as natural light and room lighting, a plurality of indoor lights, or natural light and a plurality of indoor lights, or the like, shines on the display device 200, thereby resolving heterogeneity that user feels and maximizing a transparent effect.

Figure 2:
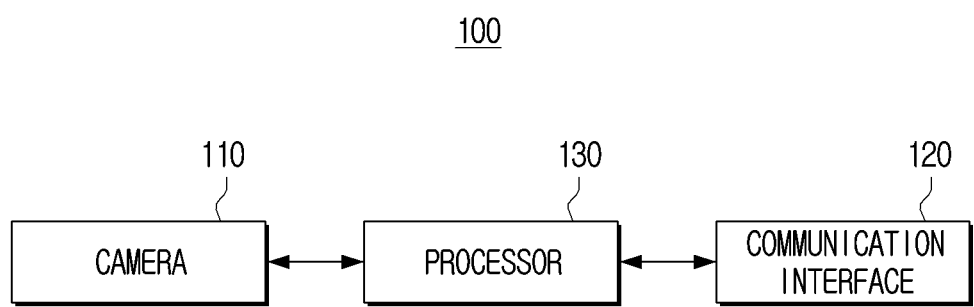
FIG. 2 is a block diagram illustrating a configuration of an electronic device according to an embodiment.

FIG. 2 is a block diagram illustrating a configuration of an electronic device according to an embodiment.

Referring to FIG. 2, the electronic device 100 may include a camera 110, a communication interface 120, and a processor 130.

The camera 110 captures an image. Specifically, the camera 110 may a background of the display device 200.

The camera 110 may be configured of an image sensor (not illustrated), a lens (not illustrated), etc. and may process image frames such as image data acquired by the image sensor. Meanwhile, the image data acquired by the camera 110 may include gradation values of pixels red (R), green (G), blue (B) (that is, Gray level, mainly 8 bits, and this may be presented as Gray with 256 level).

The communication interface 120 may communicate with the display device 200. The communication interface 120 may transmit/receive various data with the display device.

In this regard, the communication interface 120 may perform communication with the display device 200 through various communication methods. For example, the communication interface may use a communication module to communicate with the display device 200 according to a communication standard such as Bluetooth, Wi-Fi, or the like.

The processor 130 may control the overall operation of the electronic device 100.

The processor 130 may capture the background of the display device 200 through the camera 110. In this regard, the processor 130 may display the background of the display device 200 captured by the camera 110 as a live view image on a display (not illustrated) of the electronic device 100, and when a command to capture is input, the processor may acquire the live view image displayed on the display (not illustrated) to capture a background image of the display device 200.

The background may include a background on which the display apparatus 200 is located or the surrounding thereof.

Specifically, when the display device 200 is located at a specific location, the background may include the background area behind the display device 200 which will be hidden when the display device 200 is located, before the display device 200 is located at the specific location, or a background area around thereof. In addition, after the display device 200 is located at the specific position, the background may include the background around the display device.

The processor 130 may divide the captured image into a plurality of blocks. The sizes of the plurality of blocks may be identified based on a background pattern of the display device 200.

For example, the processor 130 may identify a size of the block based on at least one of the size, complexity, and type of the background pattern, and divide the captured image into the plurality of blocks based on the identified size.

Firstly, the processor 130 may identify the size of a block based on the size of the background pattern, and divide the captured image into the plurality of blocks based on the identified size.

Specifically, the processor 130 may divide the captured image into the plurality of blocks such that each block has a size corresponding to the size of the background pattern.

The larger the size of the background pattern is, the relatively larger the size of the block may become, and the smaller the size of the background pattern is, the relatively smaller the size of the block may become.

Figure 3:
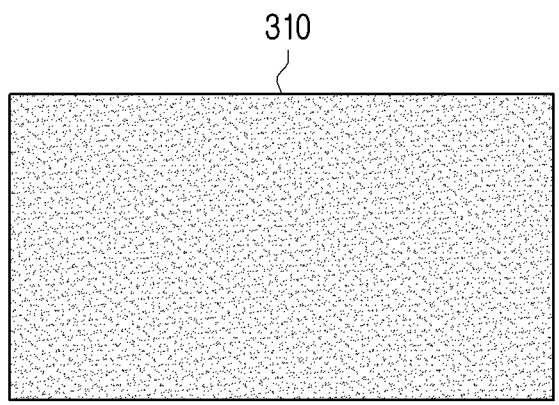
FIGS. 3 to 7 are diagrams illustrating a method of dividing an image into a plurality of blocks according to various embodiments.
Figure 3:
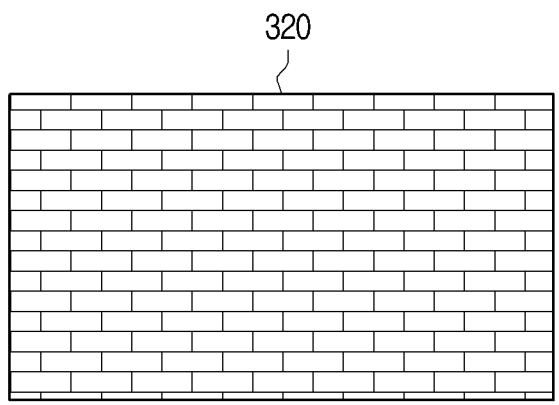

For example, as illustrated in FIG. 3(*a*), when the background of the display device 200 has a pattern 310 of fabric texture, and as illustrated in FIG. 3(*b*), the background of the display device 200 has a pattern 320 of brickwork.

In this regard, the size of the pattern 320 of brickwork, that is, the size of one brick, is larger than the size of the pattern 310 of the fabric texture, that is, the size of one object suggesting the fabric texture.

The processor 130 may divide the captured background image into a relatively large block when the captured image has a pattern in which bricks are laid as illustrated in FIG. 3(B), rather than a pattern of fabric texture as illustrated in FIG. 3(A).

As such, the processor 130 may divide the captured image into a relatively large block as a size of the background pattern of the display device 200 get larger, and divide the captured image into a relatively small block as the size of the background pattern of the display device 200 gets smaller.

The processor 130 may identify the size of the background pattern based on a frequency component of the captured image.

For example, the processor 130 may identify the frequency component of the captured image by acquiring a coefficient for each frequency component of the captured image through a discrete cosine transform (DCT). However, this is only an embodiment and the processor 130 may identify the frequency component by converting an image signal into a frequency domain through various methods, in addition to the DCT conversion.

The processor 130 may identify that the background pattern has a first size when high-frequency components is relatively more than low-frequency components in the captured image (i.e., when the image is high frequency), and identify that the background pattern has a second size when the low-frequency components is relatively more than the high-frequency components (i.e., the image is low frequency). Here, the second size may be greater than the first size.

In other words, the processor 130 may identify that the size of the background pattern is small when the high-frequency components is relatively more than the low-frequency components in the captured image, and identify that the size of the background pattern is large when the low-frequency components is relatively more than the high-frequency components in the captured image.

The processor 130 may identify the size of the block corresponding to the size of the background pattern, and divide the captured image into the plurality of blocks so that each block has the identified size.

The electronic device 100 may pre-store information on the size of the block corresponding to the size of the background pattern.

For example, the electronic device 100 may store information about a size of a block corresponding to a small size pattern and information about a size of a block corresponding to a large size pattern.

Accordingly, the processor 130 may divide the captured image into the plurality of blocks based on the size of the pattern.

Figure 4:
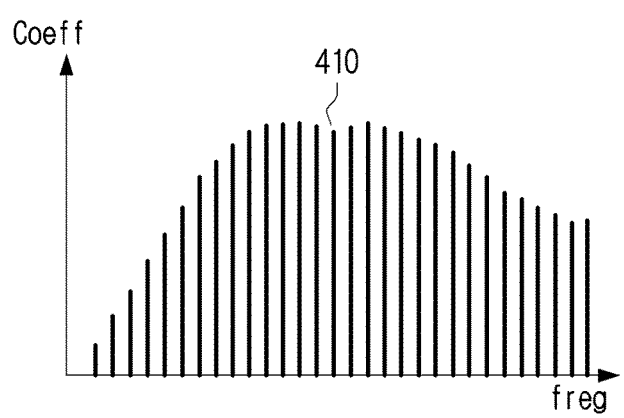
Figure 4:
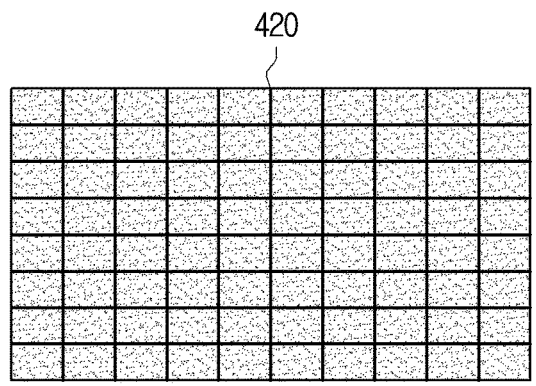
Figure 4:
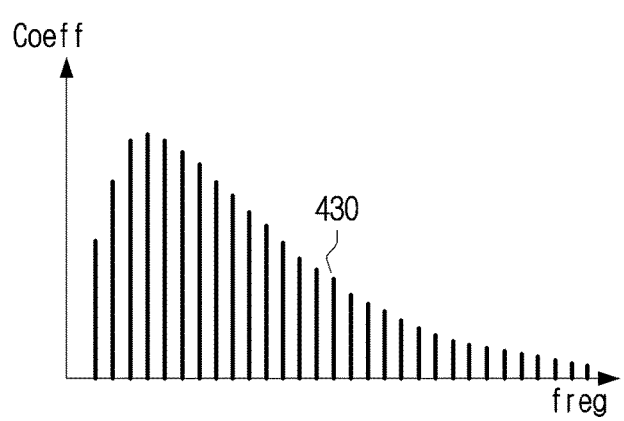
Figure 4:
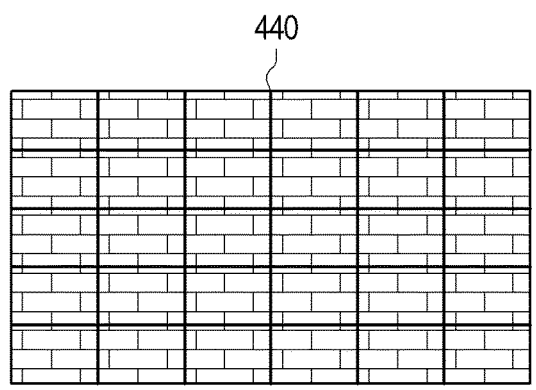

For example, FIG. 4(A) assumes that a histogram 410 with respect to a coefficient of each frequency component of the captured image.

As illustrated in FIG. 4(A), there are relatively more high-frequency components than the low-frequency components in the captured image. As such, when the captured image is high frequency, the processor 130 may identify that the background pattern of the display device 200 is small, and as illustrated in FIG. 4(B), and divide the captured image into the plurality of blocks 420 such that each block has a size corresponding to the size of pattern.

In addition, it is assumed that the histogram 430 of the coefficient of each frequency component of the captured image is as shown in FIG.

As illustrated in FIG. 4(C), there are relatively more low-frequency components than high-frequency components in the captured image. As such, when the captured image is a low frequency, the processor 130 may identify that the background pattern of the display device 200 is large, and as illustrated in FIG. 4(D), and divide the captured image into the plurality of blocks 420 such that each block has a size corresponding to the size of pattern.

Accordingly, the larger the pattern of the background of the display device 200 is, the larger the size of the block may become, and the smaller the pattern of the background of the display device 200 is, the smaller the size of the block may become.

Meanwhile, the processor 130 may identify the size of the block based on complexity of the background, and divide the captured image into a plurality of blocks based on the identified complexity.

In other words, the processor 130 may divide the captured image into the plurality of blocks such that each block has a size corresponding to the complexity of the background.

In this regard, the higher the complexity of the background is, the relatively larger the block size may become, and the lower the complexity of the background is, the relatively smaller the block size may become.

For example, it is assumed that the background of the display device 200 has various patterns 510 as illustrated in FIG. 5(A), the background of the display device 200 has a pattern 520 of narrow wooden boards standing side by side as illustrated in FIG. 5(B), and the background of the display device 200 has a pattern 530 in which square bricks are laid as shown in FIG. 5(C).

In this case, a background pattern may be complex in an order of the pattern 530 in which square bricks are laid, the pattern 520 of narrow wooden boards standing side by side, and the various patterns 510.

In this regard, the processor 130 may divide the captured background image into blocks of relatively larger sizes when the background has the pattern 520 of narrow wooden boards standing side by side as illustrated in FIG. 5(B) rather than the pattern 530 in which square bricks are laid as illustrated in FIG. 5(C), and the processor 130 may divide the captured background image into blocks of relatively larger sizes when the background has the various patterns 510 rather than the pattern 520 of narrow wooden boards standing side by side.

As described above, as the complexity of the background pattern of the display device 200 increases, the processor 130 may divide the captured image into blocks of relatively large size, and as the complexity of the background pattern of the display device 200 decreases, the processor 130 may divide the captured image into blocks of relatively small size.

The processor 130 may identify the complexity of the background pattern based on a variance of the captured image.

To be specific, the processor 130 may calculate a variance of gradation value of each pixel of the captured image, and identify complexity corresponding to the calculated variance among the plurality of variances as the complexity of the background pattern.

Information about the complexity corresponding to the variance may be pre-stored in the electronic device 100.

For example, the electronic device 100 may store information about when a variance is less than a, complexity corresponding thereto is low, and when a variance is more than a and less than b, complexity corresponding thereto is medium, and when a variance is more than or equal to b, complexity corresponding thereto is high (where a<b).

Figure 5:
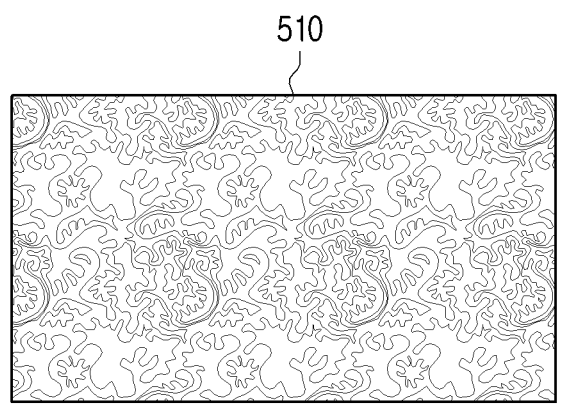
Figure 5:
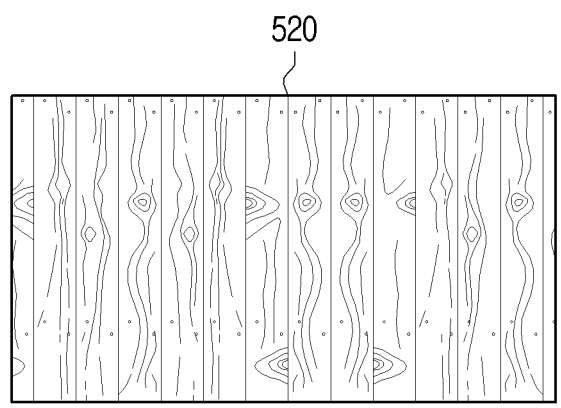
Figure 5:
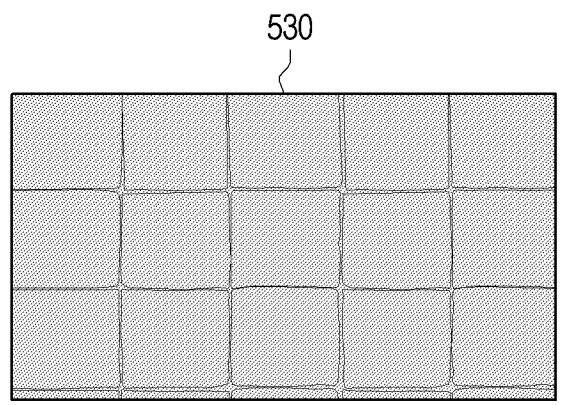

For example, as for FIG. 5, it is assumed that when the background image having the pattern 510 as illustrated in FIG. 5(A) is captured, the variance calculated from the captured background image is 2416, when the background image having the same pattern 520 as the FIG. 5(B) is captured, the variance calculated from the captured background image is 977, and when the background image having the same pattern 530 as FIG. 5(C) is captured, the variance calculated from the captured background image is 139.

In this case, the processor 130 may identify that complexity of the background image having the same pattern 510 is high as illustrated in FIG. 5(A), complexity of the background image having the same pattern 520 as illustrated in FIG. 5(B) is medium, and complexity of the background image having the same pattern 530 as illustrated in FIG. 5(C) is low.

The processor 130 may identify the size of a block corresponding to the complexity of the background pattern, and divide the captured image into the plurality of blocks so that each block has an identified size.

In this regard, the electronic device 100 may pre-store information on the size of the block corresponding to the complexity of the background pattern.

For example, the electronic device 100 may pre-store information on a size of the block corresponding to the pattern of low complexity, information on a size of the block corresponding to the pattern of medium complexity, and information on a size of the block corresponding to the pattern of high complexity.

Accordingly, the processor 130 may divide the captured image into the plurality of blocks based on the complexity of the pattern.

Figure 6:
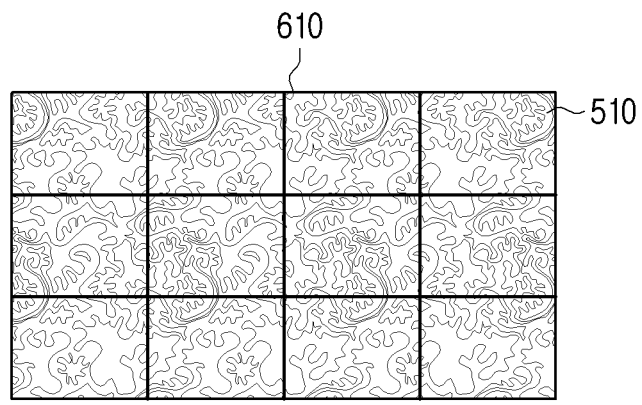
Figure 6:
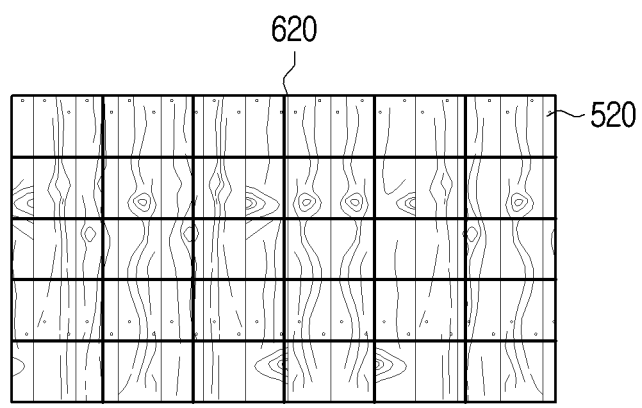
Figure 6:
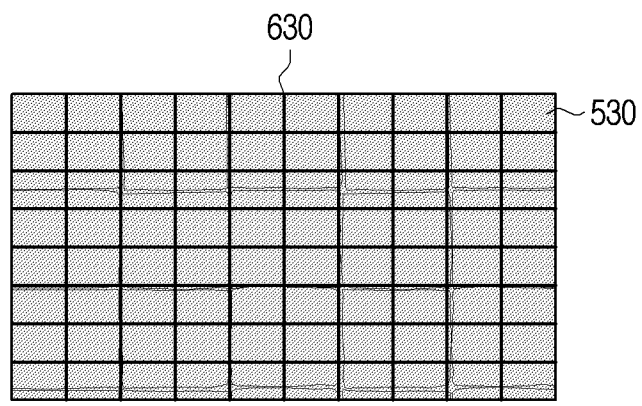

For example, complexity of the background having the same pattern 510 as illustrated in FIG. 5(A) is high. In this regard, the processor 130 may divide the captured image into the plurality of blocks 610 such that each block has a size corresponding to the size of the high complexity as illustrated in FIG. 6(A). In addition, complexity of the background having the same pattern 520 as illustrated in FIG. 5(B) is medium. In this regard, the processor 130 may divide the captured image the plurality of blocks 620 such that each block has a size corresponding to the size of the medium complexity as illustrated in FIG. 6(B). In addition, complexity of the background having the same pattern 530 as illustrated in FIG. 5(C) is low. In this regard, the processor 130 may divide the captured image into the plurality of blocks 630 such that each block has a size corresponding to the size of the low complexity as illustrated in FIG. 6(C).

Accordingly, the more complex the background pattern of the display device 200 is, the larger the size of the block may become, and the less complex the background pattern of the display device 200, the smaller the size of the block may become.

Meanwhile, the processor 130 may identify the size of the block based on the type of the background pattern, and divide the captured image into the plurality of blocks based on the identified size.

Specifically, the processor 130 may divide the captured image into the plurality of blocks such that each block has a size corresponding to the type of the background pattern.

In this regard, the processor 130 may identify the type of the background pattern by performing an image search with respect to the captured image through a web server (not illustrated).

To this end, a communication interface 120 may include a communication module for connecting to the web server (not illustrated) through a network.

Specifically, the processor 130 may transmit an image captured through the communication interface 120 to the web server (not illustrated), and receive a result of the image search from the web server (not illustrated) through the communication interface 120.

Accordingly, the processor 130 may identify the type of the background pattern based on the result of the image search. The processor 130 may identify the size of the block corresponding to the type of the background pattern, and divide the captured image into the plurality of blocks such that each block has the identified size.

To this end, the electronic device 100 may pre-store information on the size of the block corresponding to the type of the background pattern, or the like.

Figure 7:
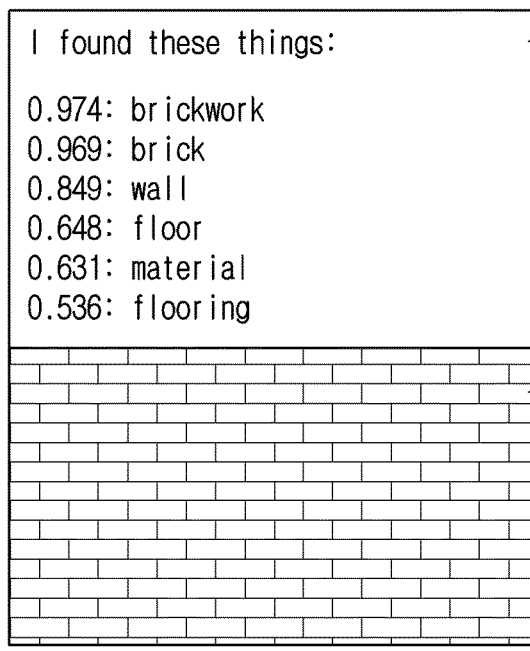
Figure 7:
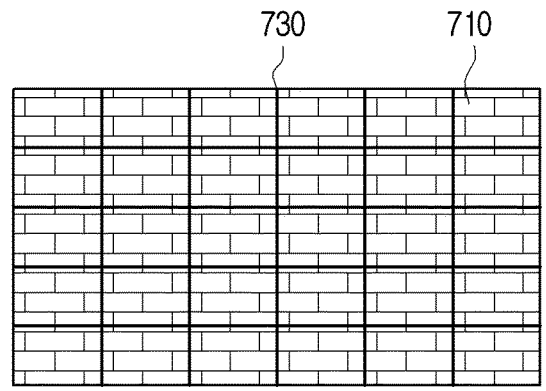
Figure 7:
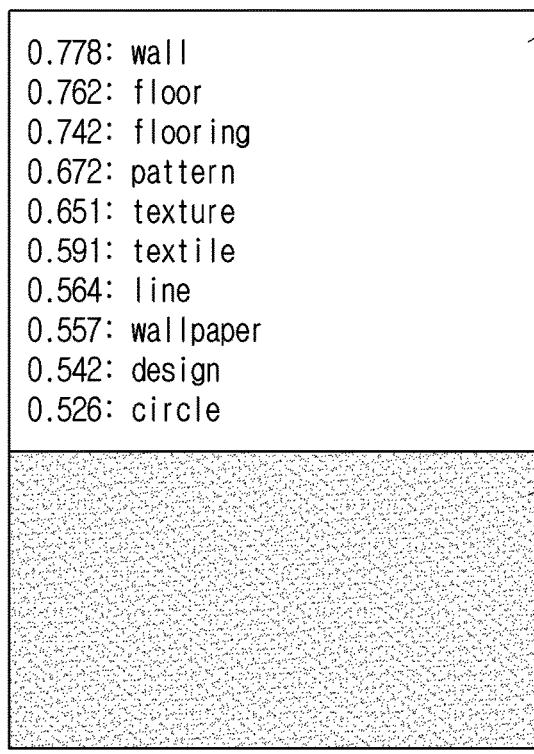
Figure 7:
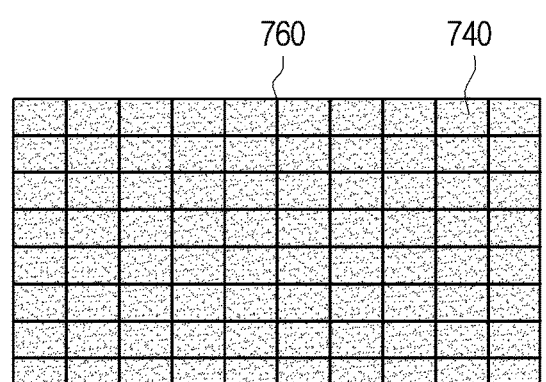

For example, as illustrated in FIG. 7(A), when a brickwork is recognized in the captured image 710 (720) as a result of the image search, the processor 130 may identify that the background pattern is a brick type, and divide the captured image 710 into the plurality of blocks 730 such that each block has a size corresponding to a brick type, as illustrated in FIG. 7(B).

In addition, as illustrated in FIG. 7(B), when a texture or a wallpaper is recognized in the captured image 740 (750) as a result of the image search, the processor 130 may identify that the background pattern is a fabric texture type, and divide the captured image 740 into the plurality of blocks 760 such that each block has a size corresponding to the fabric texture type, as illustrated in FIG. 7(D).

As such, the processor 130 may divide the captured image into the plurality of blocks based on at least one of the size, complexity, and type of the background pattern.

Thereafter, the processor 130 may compare gradation values of the each of the plurality of blocks with a target gradation value to adjust the gradation values of the each of the plurality of blocks.

Specifically, the processor 130 may normalize the gradation values of the each of the plurality of blocks and compare average values of the normalized respective gradation values with the normalized gradation values to calculate an adjustment value for the each of the plurality of blocks, and adjust the gradation values of the each of the plurality of blocks based on the calculated adjustment value.

Firstly, the processor 130 may identify a representative value of R, G, and B gradation values for the each of the plurality of blocks.

For example, the processor 130 may identify an average value of the R, G, and B gradation values of pixels of the respective blocks as representative values of the R, G, and B gradation values of the respective blocks. However, this is only an embodiment, and the processor 130 may identify the smallest R, G, B gradation value or the largest R, G, B gradation value among the R, G, B gradation values of the pixels of the respective blocks as representative values of the R, G, and B gradation values of the respective blocks.

The processor 130 may calculate an average value of the R, G, and B gradation values for the plurality of blocks by using the R, G, and B representative values for the respective blocks. In other words, the processor 130 may use the R, G, and B representative values for the respective blocks to calculate the average value of the R, G, and B gradation values for an entire captured image.

For example, assuming that the representative values of the R, G, and B gradation values of a first block are 221, 226, and 235, and the representative values of the R, G, and B gradation values of a second block are 232, 235, and 186, and all blocks are composed of these two blocks.

In this case, the processor 130 may calculate average values of the R, G, and B gradation values of the entire block to 226.5 (=(221+232)/2), 230.5 (=(226+235)/2), 210.5 (=(235+186)/2).

Thereafter, the processor 130 may normalize the representative value of the R, G, and B gradation values for the respective blocks and the average values of the R, G, and B gradation values for the the plurality of blocks.

For example, the processor 130 may normalize representative values of the R, G, and B gradation values for the respective blocks and average values of the R, G, and B gradation values for the the plurality of blocks, through R/G and B/G.

In other words, assuming that the R, G, and B representative values of the first block are 221, 226, and 235, and the R, G, and B representative values of the second block are 232, 235, and 186, and the R, G, and B averages values for the entire block are 226.5, 230.5, and 210.5.

In this case, the processor 130 may normalize the R, G, and B representative values for the first block to 0.978 (=R/G=(221/226)) and 1.04 (=B/G=(235/226)). R, G, and the R, G, and B representative values for the second block to 0.987 (=R/G=(232/235)), 0.791 (=B/G=(186/235)), and the R, G, and B average values for the entire block to 0.983 (=R/G=(226.5/230.5)).

Thereafter, the processor 130 may compare the normalized gradation values for the respective blocks with the normalized average values for the the plurality of blocks, identify the R, G, and B gradation values, which should be adjusted in the respective blocks, in order that the normalized gradation values for the respective blocks become normalized average values for the the plurality of blocks, and adjust the R, G, and B gradation values of the pixels of the respective blocks as much as the identified value to adjust gradation values of the each of the plurality of blocks.

For example, the processor 130 may identify the R, G, and B gradation values, which should be adjusted, in order that the normalized gradation values 0.978 and 1.04 for the first block become the normalized average values 0.983 and 0.913 for the entire block, and adjust the R, G, and B gradation values of the respective pixels of the first block as much as the identified gradation values. In addition, the processor 130 may identify the R, G, and B gradation values, which should be adjusted, in order that the normalized gradation values 0.987 and 0.791 for the second block become the normalized average values 0.983 and 0.913 for the entire block., and adjust the R, G, and B gradation values of the respective pixels of the second block as much as the identified gradation values.

Based on the method described above, the processor 130 may adjust the gradation value of the captured image for the respective blocks.

Thereafter, the processor 130 may transmit the image with adjusted gradation values to the display device 200 through the communication interface 120.

In other words, the processor 130 may transmit the background image with adjusted gradation values to a ray device 10, and display the background image received from the electronic device 100.

As described above, according to various embodiments of the disclosure, a white balance of the captured image may be more precisely corrected in that the gradation values of the captured background image are adjusted by the respective blocks.

In addition, the size of the block is identified based on the size, complexity and type of the background pattern, so that the R, G, B gradation values of deviation, caused by the pattern, can be reduced when light shines on the pattern by an illumination, thereby minimizing an effect of the pattern and correcting the white balance.

Figure 8:
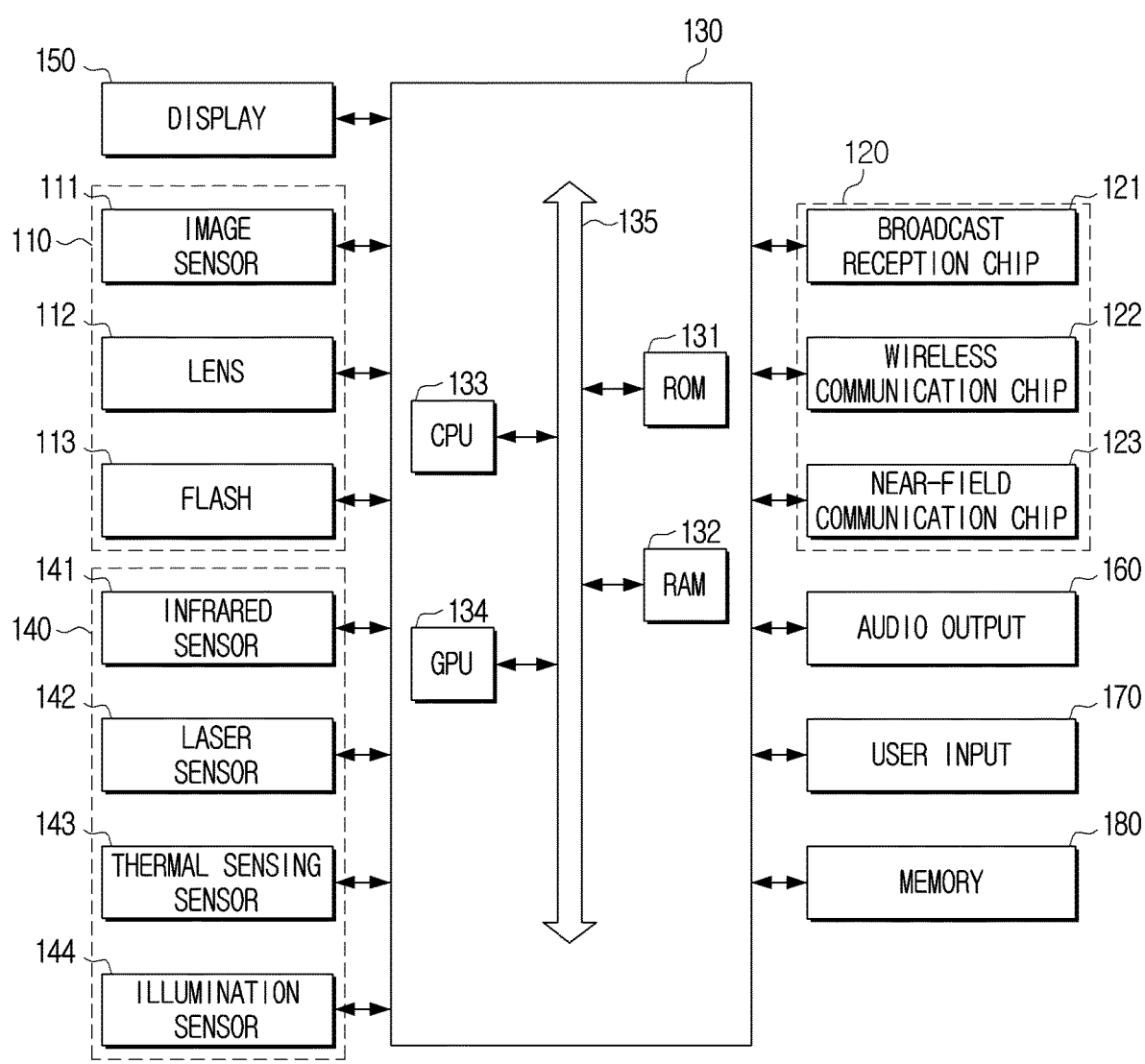
FIG. 8 is a block diagram illustrating a detailed configuration of an electronic device according to an embodiment.

FIG. 8 is a block diagram illustrating a detailed configuration of an electronic device according to an embodiment.

Referring to FIG. 8, the electronic device 100 may include a camera 110, a communication interface 120, a processor 130, a sensor 140, a display 150, an audio outputter 160, and a user inputter 170 and a memory 180.

Meanwhile, the elements of the electronic device 100 illustrated in FIG. 8 is merely one of embodiments, and may not be necessarily limited to the block diagram described above. Thus, one or more of the elements of the electronic device 100 illustrated in FIG. 8 may be omitted or modified, or one or more elements may be added to the electronic device 100.

Since the camera 110, the communication interface 120, and the processor 130 have been described with reference to FIG. 2, detailed descriptions thereof will be omitted.

The camera 110 captures an image. To this end, the camera 110 may be composed of an image sensor 111, a lens 112, a flash 113, and the like, and may process an image frame such as a still image or a video acquired by the image sensor.

The communication interface 120 may communicate with various types of external devices according to various methods of communication.

For example, the communication interface 120 may include one or more modules which enable wireless communication between the electronic device 100 and a wireless communication system, between the electronic device 100 and another electronic device 100, or between the electronic device 100 and an external server. In addition, the wireless communication interface 120 may include one or more modules for connecting the electronic device 100 to one or more networks.

The communication interface 120 may include at least one among a broadcast receiving chip 121, a wireless communication chip 122, and a short range communication chip 123. The processor 130 may communicate with an external server or various external devices using the communication interface 120.

The sensor 140 may include one or more sensors for sensing at least one of information in the electronic device 100, environment information of the electronic device 100, and user information.

For example, the sensor 140 may include an infrared sensor (IR sensor) 141, a laser sensor 142, a thermal sensor 143, and an illumination sensor 144. The processor 130 may utilize information sensed by these sensors.

The display 150 may display content. The content may include a still image such as a photo, a document, a web page, a broadcast program, a movie, and the like, and a video.

The display 150 may be implemented as various types of displays, such as a liquid crystal display (LCD), and the like.

In addition, the display 150 may be implemented as a touch screen including a layer structure in combination with a touch panel (not illustrated). The touch screen may have not only a display function, but also a function to detect not only a touch input location and a touched input area but also a touch input pressure. Further, the touch screen may have a function to detect a proximity touch as well as a real touch.

Accordingly, the display 150 may provide an input interface between the electronic device 100 and the user, and may also provide an output interface between the electronic device 100 and the user.

The audio outputter 160 is a component that outputs various notice sounds or voice message as well as various audio. Specifically, the audio outputter 160 may be implemented as a speaker, but this is merely one of various embodiments of the disclosure. The audio outputter 160 may be implemented as an output terminal capable of outputting audio.

The user inputter 170 may receive and transmit various user inputs to the processor 130.

The user inputter 170 may include a touch panel (not illustrated), a (digital) pen sensor (not illustrated), or a key (not illustrated). The touch panel (not illustrated) may, for example, use at least one of electrostatic type, pressure sensitive type, infrared type, and an ultraviolet type. The touch panel (not illustrated) may further include a control circuit. The touch panel (not illustrated) may further include a tactile layer to provide a tactile response to a user. The (digital) pen sensor (not illustrated), for example, may be part of a touch panel or include a separate detection sheet. The key (not illustrated), for example, may include a physical button, an optical key, or a keypad.

The processor 130 may control the overall operation of the electronic device 100. For example, the processor 130 may control hardware components or software elements connected to the processor 130 by driving an O/S or an application program and process or compute various data. Further, the processor 130 may load and process a command or data received from at least one of the other components to a volatile memory and store diverse data in a non-volatile memory.

For this operation, the processor 130 may be realized a dedicated processor for performing functions (e.g., embedded processor) or a generic-purpose processor for performing functions by running one or more software programs stored in a memory device (e.g., a CPU or an application processor).

The processor 130 may include a ROM 131, a RAM 132, a CPU 133, and a GPU 134, and these may be connected to each other through a bus 135.

The CPU 133 may access a memory 165 and boot using the O/S stored in the memory 165. The CPU 133 may also perform various operations by using various types of programs, contents, data, and the like stored in the memory 165.

The ROM 131 may store a set of commands for system booting. If a turn-on command is input and the power is supplied, the CPU 133 copies the O/S stored in the memory 180 into the RAM 132 according to the command stored in the ROM 131, and boots the system by executing the O/S. When the booting is completed, the CPU 133 may copy the various programs stored in the memory 180 to the RAM 132, and perform various operations by implementing the programs copied to the RAM 132.

Upon completion of the boot-up operation, the GPU 134 may generate a screen including various objects, such as icons, images, text, or the like.

The memory 180 may store various programs and data necessary for the operation of the electronic device 100. The memory 180 may store command or data received from the processor 130 or other components or generated by the processor 130 or other components.

The memory 180 may be implemented as a non-volatile memory, a volatile memory, a flash memory, a hard disk drive (HDD), a solid state drive (SDD), and the like. The memory 180 may be accessed by the processor 130, and perform readout, recording, correction, deletion, update, and the like, on data by the processor 130.

Meanwhile, in the above-described embodiment, it has been described that the electronic device 100 captures the background of the display device 200 and adjusts gradation values of the captured image.

However, in addition to the method above, the display device 200 may adjust a gradation value of an image displayed or adjust brightness, and this will be described in more detail below.

Figure 9:
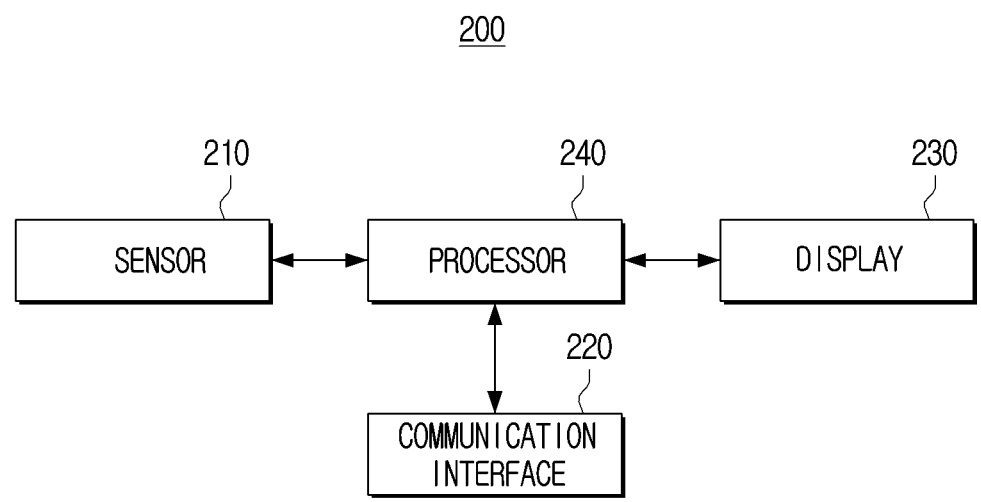
FIG. 9 is a block diagram illustrating a configuration of a display device according to an embodiment.

FIG. 9 is a block diagram illustrating a configuration of a display device according to an embodiment.

As shown in FIG. 9, the display device 200 includes a sensor 210, a communication interface 220, a display 230, and a processor 230.

The sensor 210 may receive light around the display device 200 and detect a gradation value of the received light.

The sensor 210 may be disposed at a specific position of the display device 200 by being composed of one sensor, or disposed at a position spaced apart from each other on the display device 200 by being composed of a plurality of sensors.

The sensor may be implemented as various types of sensors (e.g., illuminance sensor, color sensor, etc.) capable of detecting R, G, and B gradation values of light, or detecting illuminance, color coordinates, and color temperature.

The communication interface 220 communicates with an external device. The communication interface 220 may transmit and receive various data with the external device 200. The external device may refer to the electronic device 100.

Specifically, the communication interface 220 may perform communication with the electronic device 100 through various communication methods. For example, the communication interface 220 may perform communication with the electronic device 100 according to a communication standard such as Bluetooth, Wi-Fi, etc. using a communication module.

The display 230 displays an image. In particular, the display 230 may be captured by the electronic device 100 and display a background image received from the electronic device 100 through the communication interface 220.

The display 230 may include a display panel (not illustrated) such as a liquid crystal display (LCD), a backlight (not illustrated), a panel driver (not illustrated), and a light source controller (not illustrated).

The processor 240 controls overall operations of the display device 200. For example, the processor 240 may control hardware components or software elements connected to the processor 240 by driving the O/S or an application program and process or compute various data. Further, the processor 240 may load and process a command or data received from at least one of the other components to a volatile memory and store diverse data in a non-volatile memory.

For this operation, the processor 240 may be realized a dedicated processor for performing functions (e.g., embedded processor) or a generic-purpose processor for performing functions by running one or more software programs stored in a memory device (e.g., a CPU or an application processor).

In this example, the processor 240 may receive a background image captured by the electronic device 100.

The processor 240 may receive the R, G, and B gradation values of light around the display device 200 detected by the sensor 210, and use the R, G, and B gradation values to identify color coordinates, color temperature and illuminance around the display device 200.

The processor 240 may adjust the gradation value of an image displayed on the display 230 based on the color coordinates or the color temperature.

For this operation, the display device 200 may store information about a gradation value (hereinafter, referred to as a corrected gradation value) corrected according to color coordinates or color temperature around the display device 200.

Accordingly, the processor 240 may correct the gradation value of the image based on a pre-stored corrected gradation value, and display the corrected image on the display 230.

For example, when it is identified that the light around the display device 200 has a yellow-based color (e.g., when the color temperature is 4000K), the processor 240 may control the panel driver (not illustrated) to increase the B gradation value among the R, G, and B gradation values of the background image based on the pre-stored corrected gradation value, and display the corrected background image to the display panel (not illustrated).

As another example, when it is identified that the light around the display device 200 has a blue-based color (e.g., when the color temperature is 6500K), the processor 240 may control the panel driver (not illustrated) to increase the R gradation value among the R, G, and B gradation values of the background image based on the pre-stored corrected gradation value, and display the corrected background image to the display panel (not illustrated).

As described above, according to an embodiment of the disclosure, the color coordinates or the color temperature of the image displayed on the display 230 are adjusted in real time according to a color of an ambient light source of the display device 200 to prevent the background image displayed on the display device 200 from being displayed to the user in a different color by the ambient light source.

Meanwhile, the processor 240 may adjust luminance of the display 230 based on the illuminance.

For this operation, the display device 200 may store information on the luminance of the display 230 according to the illuminance around the display device 200.

Accordingly, the processor 240 may identify luminance of an image based on the pre-stored luminance information, and display the image of the identified luminance on the display 230.

For example, when an illuminance level is i, and luminance stored corresponding thereof is 1, the processor 240 may control the light source controller (not illustrated) when the illuminance level around the display device 200 is i, a background image may be displayed on the display panel (not illustrated) with 1 luminance.

Accordingly, when surrounding of the display device 200 is bright, the processor 240 may display an image with high luminance.

As such, according to an embodiment of the disclosure, as a light of the display device 200 is reflected by the ambient light source so that the screen of the display device 200 is hardly visible to the user, it is possible to prevent the background image displayed on the display device 200 from being seen different from background around the background image to the user.

The display device 200 may include a plurality of sensors. The plurality of sensors may be disposed at positions spaced apart from each other on the display device 200. For example, sensors may be disposed on left and right sides of the display device 200, respectively.

The processor 240 may partially adjust the graduation value of the image or partially adjust the luminance of the display 230 based on the gradation value detected by each sensor.

For example, it is assumed that a yellow-based light source exists on the left side of the display device 200 according to sensing data of the sensor disposed on the left side of the display device 200, and a blue-based light source exists on the right side of the display device 200 according to sensing data of the sensor disposed on the right side of the display device 200.

The processor 240 may increase the B gradation value among the R, G, and B gradation values of the background image displayed on the left area of the display panel (not illustrated), and increase the R gradation value among the R, G, and B gradation values of the background image displayed on the right area of the display panel (not illustrated) to display a corrected background image on the display panel (not illustrated).

As another example, it is assumed that the illuminance on the left of the display device 200 is $i_1$, and the illuminance on the right of the display device 200 is $i_2$ according to the sensing data of the sensor disposed on the left of the display device 200.

The processor 240 may control the light source controller (not illustrated) to display the background image displayed on the left area of the display panel (not illustrated) as $l_1$, luminance corresponding to the illuminance level $i_1$, and the background image displayed on the right area of the display panel (not illustrated) as $l_2$, luminance corresponding to the illuminance level $i_2$, and display an image of which luminance is adjusted on the display panel (not illustrated).

As such, according to an embodiment of the disclosure, the gradation value and the luminance of the image may be partially adjusted.

Meanwhile, as for another example, the processor 240 may detect a direction in which light shines on the display device 200 through a sensor, and display content on the display 230 according to the direction of the light.

For example, it is assumed that a sensor is disposed on each of upper left and upper right sides of the display device 200. When the light is detected by the sensor on the upper left side, the processor 240 may identify that a light source exists on the left of the display device 200, and when the light is detected by the sensor on the upper right side, the processor 240 may identify that the light source exists on the right of the display device.

In addition, the processor 240 may identify a direction of shadow displayed on the display 230 according to the direction of light, and display shadow on a content based on the identified direction of the shadow.

For example, the processor 240 may display a shadow in the right direction of the content when the light source exists on the left of the display device 200, and display a shadow in the left direction of the content when the light source exists on the left side of the display device 200.

Meanwhile, as for another example, the processor 240 may identify a current time based on time information set in the display device 200 or real time logic of the processor 240, or receive time information from a network to identify the current time.

In addition, when the current time is in the night time and an ambient illuminance detected by the sensor is less than or equal to a preset value, the processor 240 may cut off power supplied to the panel driver (not illustrated) and the light source controller (not illustrated). Accordingly, power consumption can be reduced.

Meanwhile, when the current time is in the daytime, the processor 240 may identify whether ultraviolet light exists in the light detected by the sensor, and when the ultraviolet light is detected, the processor 240 may increase luminance of an image displayed on the display panel (not illustrated) to a specific value, thereby solving the problem that the screen is hard to be seen due to the external light.

As described above, according to various embodiments of the disclosure, when the display device 200 displays the background screen, it is possible to resolve the difference that the user feels according to illumination environment, and thus maximize a transparent effect.

Meanwhile, the embodiment described above has described that the electronic device 100 captures the background of the display device 200, divides the captured image into the plurality of blocks, adjusts the gradation value of the each of the plurality of blocks, and transmit the image in which the gradation value is adjusted to the display device 200.

However, this is merely an embodiment, and may be performed through the display device 200.

That is, the electronic device 100 may capture the background of the display device 200 and transmit the captured image to the display device 200. The processor 240 of the display device 200 may divide the image received from the electronic device 100 into the plurality of blocks, adjust the gradation values of the each of the plurality of blocks, and display the image of which the gradation value is adjusted on the display 230.

Meanwhile, the method of dividing the image into the plurality of blocks in the display device 200 and adjusting the gradation values of the respective blocks may be the same as the method performed by the electronic device 100. The operation performed by components of the electronic device 100 may be performed in components of the display device 200 corresponding thereto (for example, an operation performed by the processor 130 of the electronic device 100 may be performed by the processor 240 of the display device 200).

Figure 10:
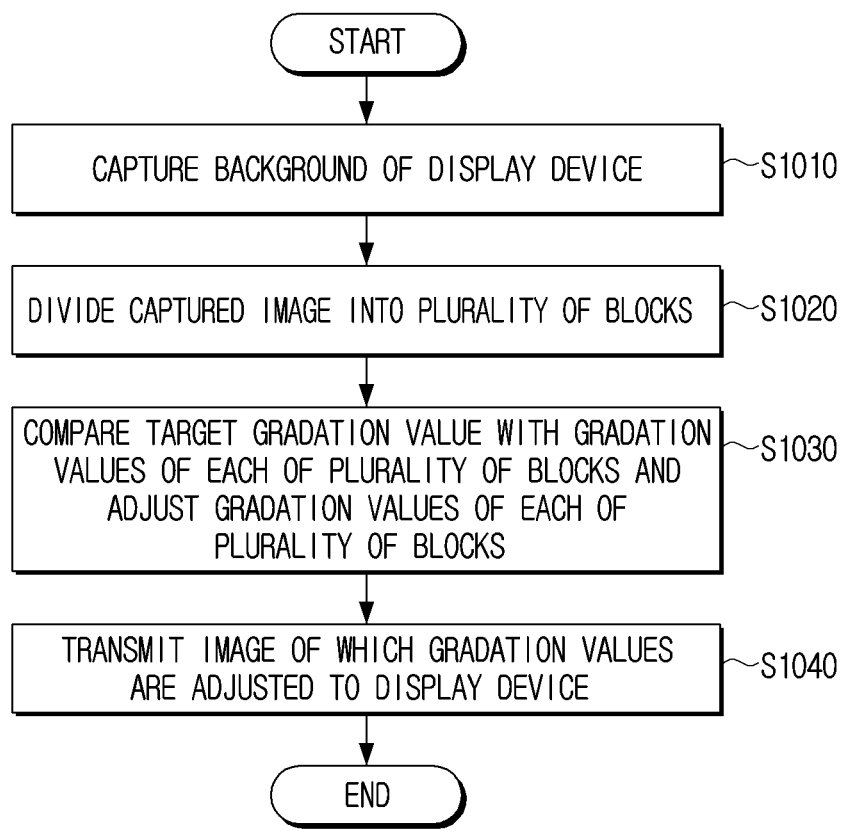
FIG. 10 is a flowchart illustrating an image correction method according to an embodiment.

FIG. 10 is a flowchart illustrating an image correction method according to an embodiment.

The background of the display device is captured (S1010), and the captured image is divided into the plurality of blocks (S1020).

Thereafter, a target gradation value is compared with gradation values of the each of the plurality of blocks to adjust the gradation values of the each of the plurality of blocks (S1030), and an image, the gradation values of which have been adjusted, is transmitted to the display (S1040).

In this regard, sizes of the plurality of blocks may be identified based on the background pattern of the display device.

Specifically, as for S1020, the block size may be identified based on at least one of a size, complexity, and a type of the background pattern, and the captured image may be divided into the plurality of blocks on the basis of the identified size.

Firstly, as for step S1020, the captured image is divided into the plurality of blocks such that each block has a size corresponding to the size of the background pattern. The larger the size of the background pattern is, the relatively larger the size of the block may become, and the smaller the size of the background pattern is, the relatively smaller the size of the block may become.

In this regard, based on the frequency component of the captured image, when there are relatively more high-frequency components than the low-frequency components in the captured image, it may be identified that the background pattern has the first size, and when there are relatively more low-frequency components than the high-frequency components in the captured image, it may be identified that the background pattern has the second size. The second size may be larger than the first size.

Meanwhile, as for S1020, the captured image is divided into the plurality of blocks such that each block has a size corresponding to the complexity of the background. The higher the complexity of the background is, the relatively larger the size of the block, and the lower the complexity of the background is, the relatively smaller the complexity of the background may become.

A variance of the captured image may be calculated, and the captured image may be divided into the plurality of blocks based on the complexity corresponding to the variance among the plurality of complexity.

In addition, as for S1020, the captured image may be divided into the plurality of blocks such that each block has a size corresponding to the type of the background pattern.

In this regard, an image search may be performed regarding the image captured through the web server to identify the type of the background pattern.

Meanwhile, normalizing the gradation values of the plurality of blocks, comparing the normalized respective gradation values with the average values of the normalized gradation values to calculate an adjustment value for the each of the plurality of blocks, and the gradation values of the each of the plurality of blocks may be adjusted based on the calculated adjustment values.

The specific method regarding the image correction has been described.

According to an embodiment, the various embodiments described above may be implemented as software including instructions stored in a machine-readable storage media which is readable by a machine (e.g., a computer). The device may include the electronic device according to the disclosed embodiments, as a device which calls the stored instructions from the storage media and which is operable according to the called instructions. When the instructions are executed by a processor, the processor may directory perform functions corresponding to the instructions using other components or the functions may be performed under a control of the processor. The instructions may include code generated or executed by a compiler or an interpreter. The machine-readable storage media may be provided in a form of a non-transitory storage media. The 'non-transitory' means that the storage media does not include a signal and is tangible, but does not distinguish whether data is stored semi-permanently or temporarily in the storage media.

In addition, according to an embodiment, the methods according to various embodiments described above may be provided as a part of a computer program product. The computer program product may be traded between a seller and a buyer. The computer program product may be distributed in a form of the machine-readable storage media (e.g., compact disc read only memory (CD-ROM) or distributed online through an application store (e.g., Play Store™). In a case of the online distribution, at least a portion of the computer program product may be at least temporarily stored or provisionally generated on the storage media such as a manufacturer's server, the application store's server, or a memory in a relay server.

Further, each of the components (e.g., modules or programs) according to the various embodiments described above may be composed of a single entity or a plurality of entities, and some subcomponents of the above-mentioned subcomponents may be omitted or the other subcomponents may be further included to the various embodiments. Generally, or additionally, some components (e.g., modules or programs) may be integrated into a single entity to perform the same or similar functions performed by each respective component prior to integration. Operations performed by a module, a program, or other component, according to various embodiments, may be sequential, parallel, or both, executed iteratively or heuristically, or at least some operations may be performed in a different order, omitted, or other operations may be added.

What is claimed is:

1. An electronic device comprising:
    a camera;
    a communication interface; and
    a processor configured to capture an image of a background of a display device through the camera, to divide the captured image into a plurality of blocks, to compare a target gradation value with gradation values of the each of the plurality of blocks, to adjust the gradation values of the each of the plurality of blocks, and to transmit an image of which the gradation values are adjusted to the display device through the communication interface,
    wherein the sizes of the plurality of blocks are identified based on a background pattern of the display device.

2. The electronic device as claimed in claim 1, wherein the processor is configured to identify the sizes of the blocks on the basis of at least one of a size, complexity, and a type of the background pattern and to divide the captured image into the plurality of blocks on the basis of the identified size.

3. The electronic device as claimed in claim 2, wherein the processor is configured to divide the captured image into the plurality of blocks such that each block has a size corresponding to the background pattern, and the larger the size of the background pattern is, the relatively larger the size of the block becomes, and the smaller the size of the background pattern is, the relatively smaller the size of the block becomes.

4. The electronic device as claimed in claim 3, wherein the processor is configured, on the basis of frequency components of the captured image, to identify that the background pattern has a first size, based on high-frequency components being relatively more than low-frequency components in the captured image, and to identify that the background pattern has a second size, based on low-frequency components being relatively more than high-frequency components in the capture image, wherein the second size is larger than the first size.

5. The electronic device as claimed in claim 2, wherein the processor is configured to divide the captured image into the plurality of blocks such that each block has a size corresponding to complexity of the background, and the higher the complexity of the background is, the relatively larger the size of the block becomes, and the lower the complexity of the background is, the relatively smaller the size of the block becomes.

6. The electronic device as claimed in claim 5, wherein the processor is configured to calculate a variance of the captured image and divide the capture image into the plurality of blocks on the basis of complexity corresponding to the variance among a plurality of complexity.

7. The electronic device as claimed in claim 2, wherein the processor is configured to divide the captured image into the plurality of blocks such that each block has a size corresponding to the background pattern.

8. The electronic device as claimed in claim 7, wherein the processor is configured to identify a type of the background pattern by performing image search for the captured image through a web server.

9. The electronic device as claimed in claim 1, wherein the processor is configured to normalize the gradation values of the each of the plurality of blocks, compare the normalized respective gradation values and average values of the normalized gradation values to calculate adjustment values of the each of the plurality of blocks, and adjust the gradation values of the each of the plurality of blocks on the basis of the calculated adjustment values.

10. An image correction method of an electronic device comprising:

capturing an image of a background of a display device;

dividing the captured image into a plurality of blocks;

comparing a target gradation value with gradation values of the each of the plurality of blocks and adjusting the gradation values of the each of the plurality of blocks; and transmitting an image of which the gradation values are adjusted to the display device, wherein the sizes of the a plurality of blocks are identified based on a background pattern of the display device.

11. The method as claimed in claim 10, wherein the dividing comprises identifying the sizes of the blocks on the basis of at least one of a size, complexity, and a type of the background pattern and dividing the captured image into the plurality of blocks on the basis of the identified size.

12. The method as claimed in claim 11, wherein the dividing comprises dividing the captured image into the plurality of blocks such that each block has a size corresponding to the background pattern, and the larger the size of the background pattern is, the relatively larger the size of the block becomes, and the smaller the size of the background pattern is, the relatively smaller the size of the block becomes.

13. The method as claimed in claim 12, wherein the dividing comprises, on the basis of frequency components of the captured image, identifying that the background pattern has a first size, based on high-frequency components being relatively more than low-frequency components in the captured image, and identifying that the background pattern has a second size, based on low-frequency components being relatively more than high-frequency components in the captured image, wherein the second size is larger than the first size.

14. The method as claimed in claim 11, wherein the dividing comprises dividing the captured image into the plurality of blocks such that each block has a size corresponding to complexity of the background, and the higher the complexity of the background is, the relatively larger the size of the block becomes, and the lower the complexity of the background is, the relatively smaller the size of the block becomes.

15. The method as claimed in claim 14, wherein the dividing comprises calculating a variance of the captured image and dividing the captured image into the plurality of blocks on the basis of complexity corresponding to the variance among a plurality of complexity.

\* \* \* \* \*